Sept. 24, 1957  M. WIBAULT  2,807,428
AIRCRAFT WITH ENCLOSED ROTOR
Filed July 15, 1953  4 Sheets-Sheet 1
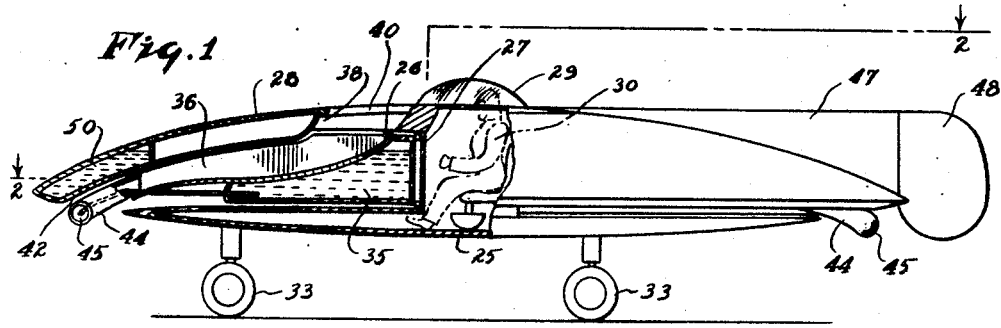
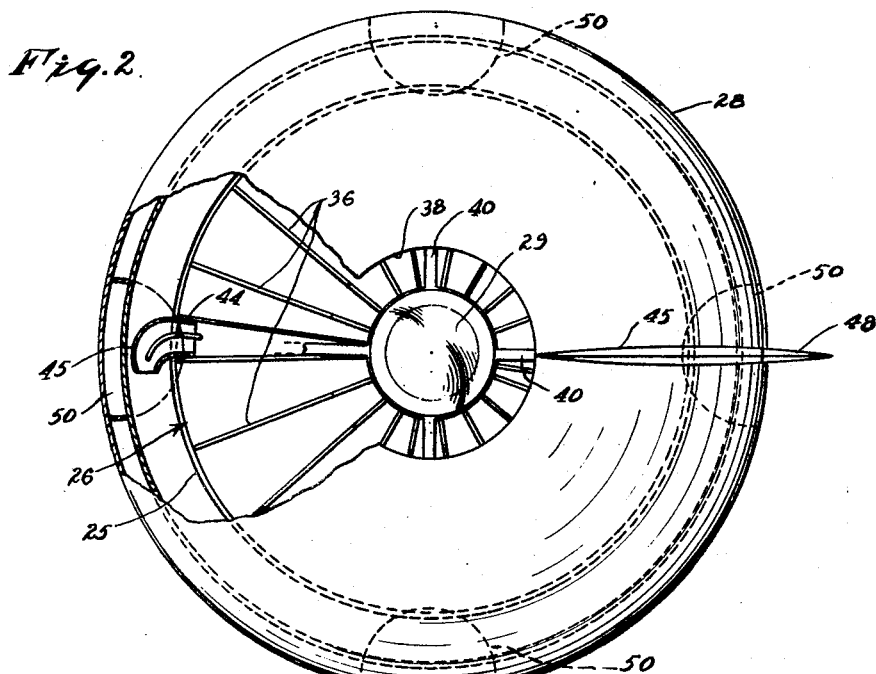
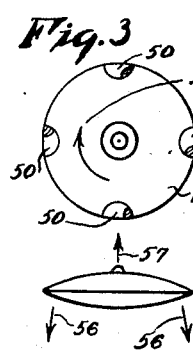
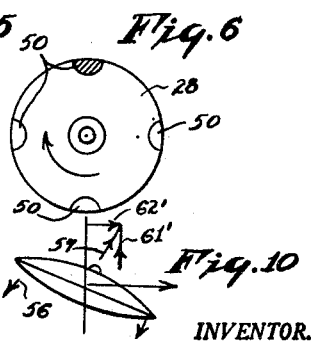
INVENTOR.
Michel Wibault
BY
ATTORNEYS

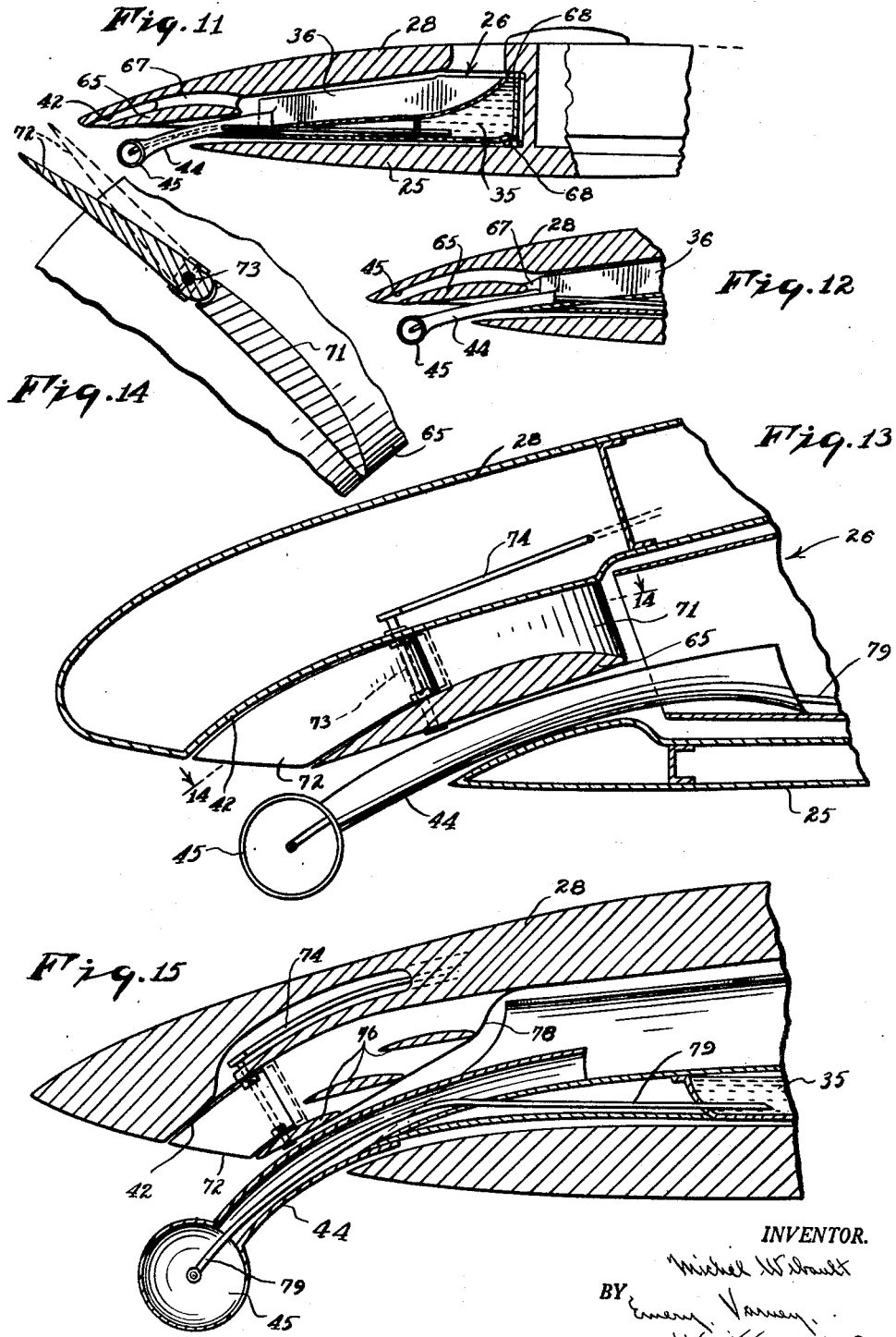

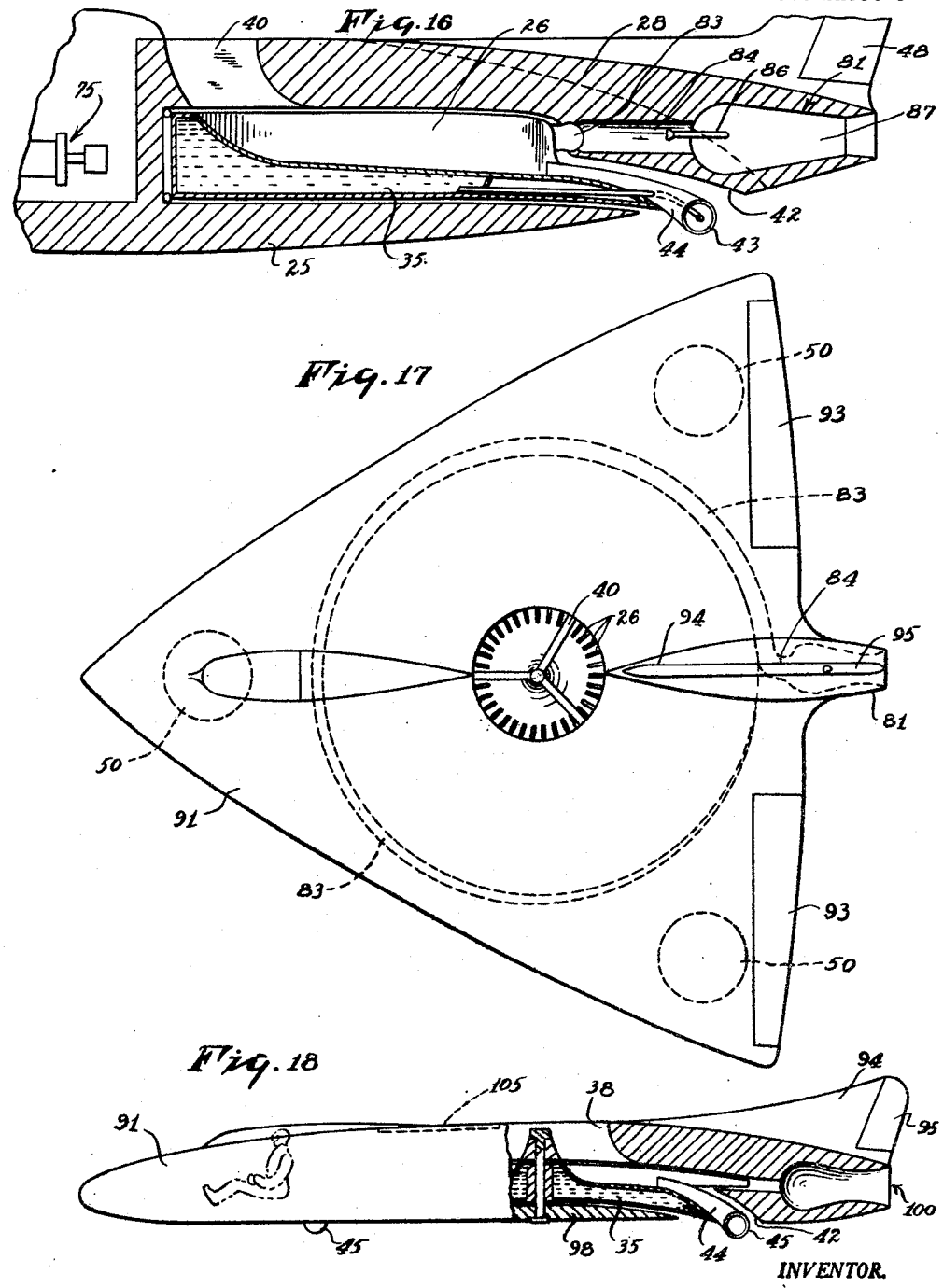

Sept. 24, 1957  M. WIBAULT  2,807,428
AIRCRAFT WITH ENCLOSED ROTOR
Filed July 15, 1953  4 Sheets-Sheet 4
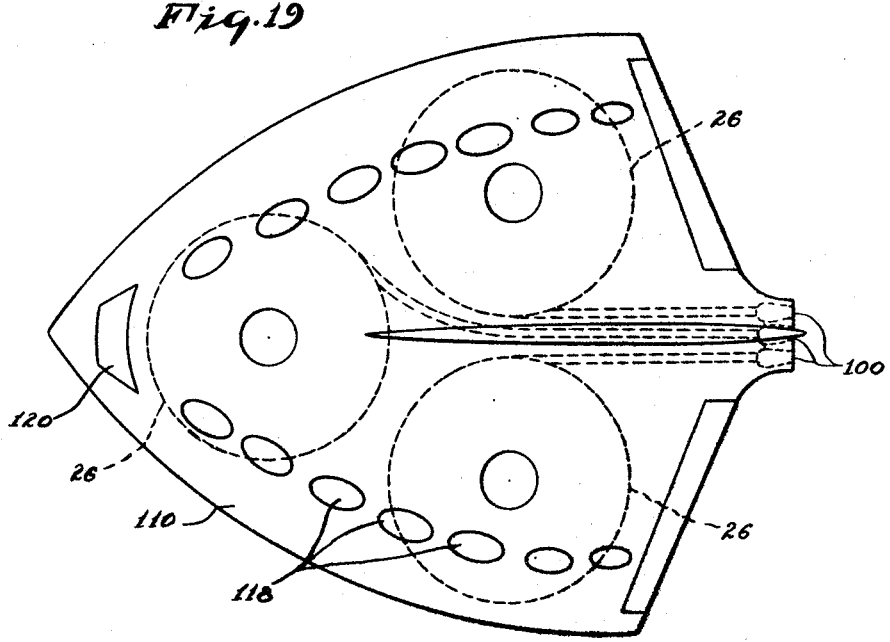
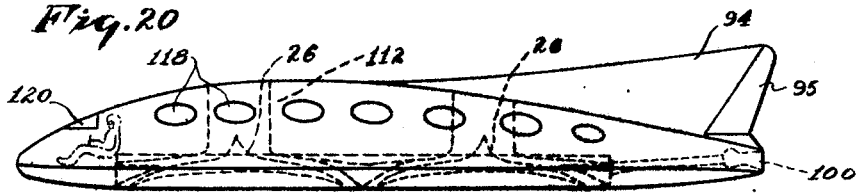
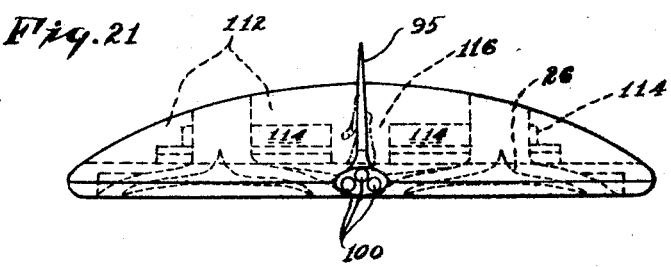
INVENTOR.
Michel Wibault
BY
ATTORNEYS

United States Patent Office 2,807,428
Patented Sept. 24, 1957

2,807,428
AIRCRAFT WITH ENCLOSED ROTOR

Michel Wibault, New York, N. Y., assignor to Vibrane Corporation, New York, N. Y., a corporation of New York Application July 15, 1953, Serial No. 368,046

22 Claims. (Cl. 244—23)

This invention relates to heavier-than-air aircraft and pertains to a novel type of aircraft which I refer to as a "Gyropter," and which possesses the flying characteristics of both the airplane and the helicopter.

The airplane and the helicopter each have specific advantages and disadvantages which are inherent in and peculiar to their types. For example, the airplane can be driven at very high speeds, but as higher and higher speeds have been achieved, wing surface areas have been reduced and wing loadings have been increased with the result that with planes designed for supersonic speeds, critical stalling speeds are very high, and large landing fields with extremely long runways are required for safety in take offs and landings. It is impossible, of course, for the airplane to rise or descend vertically or to hover.

The latter are the great virtues and advantages of the helicopter. But the great disadvantage of the helicopter is its inherent limitation in speed. When a single rotor helicopter is ascending or descending vertically, the center of lift is at or near the axis of rotation of the winged rotor. As the helicopter begins to advance in a horizontal direction, however, the center of lift shifts away from the axis of rotation and as forward speed increases, the center of lift moves further and further away from the axis of rotation, until at some critical speed the helicopter will capsize. Multiple rotors have been used in an effort to overcome this difficulty, but multiple rotors introduce other difficulties.

Aircraft according to the present invention comprise essentially a rotor mounted on and entirely enclosed within upper and lower interconnected stator elements which carry one or more annular airfoils extending around the periphery of the rotor. The rotor is mounted for rotation on a vertical axis and is preferably in the nature of a large centrifugal blower. The upper stator is provided with an intake opening preferably near or surrounding the axis of rotation of the rotor, and the rotor is provided with blades or other means, such as discs, which accelerate the air and discharge it outwardly from the periphery in a substantially horizontal direction, or at an angle producing a downwash which generates a component of vertical lift. The annular airfoils which surround the periphery of the rotor are located in the path of the air discharged from the rotor, being so arranged that the resultant of the aerodynamic forces acting thereon exerts vertical lift. Since the airfoils are entirely within and enclosed by the upper and lower stators, they are thereby protected from the influence of air currents resulting from horizontal motion of the aircraft. Consequently, there is no shift of the center of lift as horizontal speed increases.

The rotor may be driven in any suitable manner, but is preferably driven by one or more jet reactors in order to eliminate torque which would be present if the rotor were driven by a source of power located on the stators. Any tendency of the stators to rotate due to air friction or drag or to mechanical friction in the bearings between rotor and stators may be corrected aerodynamically by airfoils, preferably adjustable, located in the path of the air discharged from the rotor. Alternatively, it may be corrected gyroscopically, or, after the aircraft attains sufficient horizontal speed, by fins and/or rudders on the stators.

The aircraft may be propelled horizontally in a variety of ways. For example, the gyroscopic action of the rotor may be utilized to produce a tilt of the aircraft through which moderate horizontal speeds can be obtained. This can also be obtained by conventional aerodynamic controls connected with the stators, or by changing the angle of sectors of the lift ring or rings, or also by strangling sectors of the streams of air passing to the rotor or the lift rings. The aircraft will then move horizontally in the direction of the tilt. Alternatively or supplementally the aircraft may be propelled by propellors, jet reactors or any other suitable means mounted on the stators.

In applying the principles of the invention to aircraft of large size, it will be found to be advantageous to utilize multiple rotors rather than to attempt to utilize a single rotor of very large diameter. In such cases by suitable choice of location and direction of rotation of the rotors, any tendency of the stators to rotate may be largely eliminated.

The outside configuration of the stators may be varied depending on the size of the aircraft and the type of service for which it is designed. In the case of small single rotor aircraft, the stator assembly may be in the shape of a disk, thin at its peripheral edges and thickened toward the center. Alternatively, and more particularly in the case of high speed ships, the stator assembly is preferably in the form of a wing. In such cases, once the aircraft is off the ground and propelled horizontally at sufficient speed, the aerodynamic lift of the wing may be used to supplement the lift of the annular airfoil, or in some cases may supersede it entirely. In the latter case, doors are used to obstruct the air inlet of the rotor in order to prevent any exchange of pressure between the upper and lower parts of the stator. In the latter event the lift of the annular airfoil would be used only in ascending from or descending to an airfield.

It will be observed, therefore, that the aircraft of the present invention combines many of the advantages of the airplane and the helicopter while eliminating some of the disadvantages of each. Thus, it can ascend and descend vertically and it can hover, but it can also move horizontally at very high speeds. It is more stable in flight than either the airplane or the helicopter because of the gyroscopic effect of the rotor.

Other objects and advantages of the invention will appear hereinafter.

A preferred embodiment of the invention selected for purposes of illustration are shown in the accompanying drawings, in which, Fig. 1 is a diagrammatic, side elevation, partly broken away and in section, showing a simple aircraft embodying this invention;

Fig. 2 is a top plan view partly broken away and in section, of the aircraft shown in Fig. 1;

Figs. 3, 4, 5 and 6 are diagrammatic, reduced scale, top plan views, showing the way in which the ballast is distributed for controlling the trim of the aircraft;

Figs. 7, 8, 9 and 10 are diagrammatic side elevations showing the trim of the aircraft with the ballast distributed as in Figs. 3, 4, 5 and 6, respectively;

Fig. 11 is a view similar to Fig. 1 but showing a first modified form of the invention;

Fig. 12 is a fragmentary detail view showing a second modification of the invention;

Fig. 13 is an enlarged, fragmentary, vertical, sectional view showing the air flow to the reactor jet and the air flow to the anti-rotational fins;

Fig. 14 is a top plan view of one of the anti-rotational fins shown in Fig. 13;

Fig. 15 is an enlarged, vertical, sectional view showing a third modified form of the invention;

Fig. 16 is a vertical, sectional view showing jet propulsion means for obtaining horizontal flight;

Fig. 17 is a top plan view of a fourth modified form of the invention in which the upper stator is in the form of a delta wing;

Fig. 18 is a side elevation, partly broken away and in section of the aircraft shown in Fig. 17;

Fig. 19 is a top plan view of a fifth modified form of the invention in which a plurality of rotors are used in a single stator which is shaped as a cambered wing;

Fig. 20 is a side elevation of the modified form of aircraft shown in Fig. 19; and Fig. 21 is a rear elevation of the aircraft shown in Figs. 19 and 20.

In its simplest form the aircraft of this invention includes a lower stator 25, a rotor 26 rotatably mounted on a central hub 27, and an upper stator 28. The stators 25 and 28 are rigidly connected by the hub 27. The hub 27 is hollow and may be of substantial internal diameter to provide accommodations for passengers and freight. In the construction shown, there is a transparent turret 29 at the top of the hub 27 providing visibility for a pilot 30.

The bottom stator 25 has wheels 33 and such other landing gear structure as may be desirable. The rotor 26 has a hollow hub portion which serves as a fuel tank 35. This tank is preferably sectional or provided with anti-surge partitions. Above the fuel tank 35, the rotor 26 has blades 36 extending radially. In the construction shown in Figs. 1 and 2, the blades 36 extend along radii of the rotor, but the radially extending blades may slope in the direction of, or against the direction of rotation in accordance with conventional practice of centrifugal blowers. There is a wide annular opennig 38 in the upper stator 28 above the inner ends of the blades 36; and air is drawn downwardly through this air inlet opening 38 by the rotor 26 which operates as a centrifugal blower.

There are spars 40 extending across the air inlet opening 38 for rigidly connecting together the portions of the stator 28 which are on opposite sides of the air inlet opening 38. These spars 40 are preferably streamlined so as to offer a minimum of resistance to the flow of air to the rotor 26.

The upper stator 28 extends across the top of the rotor 26 with a running clearance. In the structure illustrated, the peripheral portion of the upper stator 28 extends beyond the ends of the rotor blades 36. The lower surface of the upper stator 28, beyond the blades 36, provides an annular surface which serves as a liftring for the aircraft. This annular surface or liftring, designated by the reference character 42, slopes downwardly so that it deflects the air from the rotor 26, and this deflecting of the air provides an upward thrust for lifting the aircraft. When the surface above the blades has a downward slope, the pressure of the air stream against this surface develops a component of lift.

The space between the peripheral portions of the lower stator 25 and upper stator 28 is open around the entire aircraft to provide running clearance for arms 44 which project from diametrically opposite locations, on the rotor 26, beyond the lower stator 25 and into the ambient atmosphere below the aircraft. There is a jet reactor 45 connected to the outer end of each of the arms 44, and these reactors 45 drive the rotor 26.

Fuel for the reactors 45 is supplied by centrifugal force from the fuel tank 35 in the rotor. These reactors 45 are used in the preferred embodiment of the invention because they provide simple and reliable means for driving the rotor without gearing or other mechanism having moving parts. In the broader aspects of the invention, however, the reactors 45 are merely representative of power means for turning the rotor 26 to draw air through the inlet opening 38 and to discharge the air against the liftring 42, or any of the other liftring constructions which will be described in connection with certain modified forms of the invention.

The upper stator 28 has a fin 47 and rudder 48 at its rearward end. There are a plurality of ballast tanks 50 located at angularly spaced regions around the peripheral portion of the upper stator 28. The construction illustrated has four ballast tanks 50. These are sufficient for controlling the trim of the aircraft, in a manner which will be described, but more than four tanks can be used if desired. There are conduits connecting the ballast tanks 50 and pumps or other suitable means for moving liquid ballast from one tank to another.

From the construction thus far described it will be apparent that the aircraft shown in Figs. 1 and 2 is capable of vertical ascent and hovering in the same manner as a helicopter because its lift does not depend upon horizontal speed. The aircraft can also move horizontally in a manner similar to a helicopter, if the nose of the aircraft is tilted downwardly so that the annular current of air, discharged by the rotor around the entire periphery of aircraft, has a net rearward component. In horizontal flight, however, the aircraft of this invention does not experience any change in the center of lift, as in the case of a helicopter, because the rotor 26 is entirely enclosed within the housing provided by the stators. The operation of the enclosed rotor is just the same with the aircraft moving horizontally as when the aircraft is hovering or moving vertically.

Fig. 3 shows the rotor turning in a clockwise direction, as indicated by the arrow 54, and ballast equally divided among all of the tanks 50. With the aircraft symmetrically loaded, as indicated in Fig. 3, the axis of the aircraft is substantially vertical and the thrust reaction from the liftrings is symmetrical about a vertical axis as indicated by the arrows 56 in Fig. 7. The axial thrust of the aircraft is directly vertical as indicated by the axial vector 57.

Since the rotor 26 acts as a large gyroscope, any pressure tending to tilt the gyroscope downwardly at the right side of the aircraft will cause the gyroscope to tilt its axis rearwardly. This phenomenon by which force at one side of a gyroscope causes the axis to tilt 90° out of phase with the applied force is a well known property of gyroscopes. The present invention takes advantage of this phenomenon by shifting the ballast from the right hand tank 50 to the left hand tank 50, as shown in Fig. 4, when it is desirable to tilt the nose of the aircraft downward for forward flight as shown in Fig. 8.

With the aircraft tilted as shown in Fig. 8, the annular air stream 56 has a rearward component, and the axial vector 57 slopes at an angle to the vertical so that it has vertical and horizontal components, indicated by the vectors 61 and 62, respectively, and the aircraft moves in a forward direction.

For greater forward speed, the aircraft can be tilted still further, as shown in Figs. 5 and 9. This is done by shifting all of the ballast into the right hand tank 50. The axial thrust component 57 has a greater slope to the vertical and thus produces a horizontal vector 62' which is greater than the vector 62, and a lift vector 61' which is somewhat less than the lift vector 61 in Fig. 8. An increase in the speed of the rotor will compensate the reduction of the lift vector 61' in order to keep the same altitude of flying.

Figs. 6 and 10 are similar to Figs. 5 and 9 except that the entire ballast is shifted to the right hand tank 50 and the direction of movement of the aircraft is rearward instead of forward. The vectors are indicated by the same reference characters as in Fig. 9 and the only difference is that the horizontal vector 62' is toward the rear instead of toward the front. It will be understood that if the rotor 26 were turning in the opposite direction to that indicated in Fig. 6, that is, were turning in a counter-clockwise direction, loading of the right hand ballast tank 50 would tilt the aircraft forwardly instead of rearwardly.

The examples shown in Figs. 3 to 10 are believed to be sufficient to illustrate the way in which trim and direction of travel of the aircraft can be statically controlled. When high speed forward movement is desirable, other power means in addition to the thrust from the rotor are used as will be explained in connection with Fig. 16.

Fig. 11 shows a first modified form of the invention in which a liftring 65 is located some distance below the liftring surface 42 of the upper stator 28. This liftring 65 is an airfoil section which is similar, in radial cross section, to a cambered airplane wing, but the liftring 65 is annular and it acts as an airplane wing of the infinite aspect ratio. The liftring 65 is connected to the upper stator 28 by vanes 67.

This construction with a liftring 65 in addition to the liftring surface 42 utilizes the airstream from the rotor 26 more efficiently; and the liftring 65 is shaped to take advantage of the Bernoulli effect in obtaining increased lift from the liftring 65.

Fig. 12 shows a second modified construction in which the liftring 65 is attached to the rotor 26, by vanes 67, instead of being attached to the upper stator 28. With this construction, the liftring 65 tends to lift the rotor 26 and this lift is transmitted to the aircraft through an upward thrust bearing at the center hub of the rotor, such as the upper thrust bearing 68 shown in Fig. 11. The rotor 26 of Fig. 11 is shown with thrust bearings 68 at both ends of its hub to provide against end play. All of the rotor bearings shown in the drawing are diagrammatic and it will be understood that all of them have provision for preventing excessive end play. In Fig. 12, the upper stator 28 still provides lift because of the reaction of the air stream against the liftring surface 42.

Fig. 13 shows a construction which is similar to Fig. 11, but with a somewhat different construction for the vanes which connect the liftring 65 to the upper stator 28. In Fig. 13, vanes 71 extend at a tangential slope to the direction of discharge of the air stream from the rotor 26. This slope of the vanes 71 is calculated to produce a torque for the upper stator 28 equal and opposite to the torque which results from air friction and friction of the rotor on the hub bearing. When the aircraft has no horizontal movement for making its fin and rudder effective, and no other means are provided to counteract the effect, there is a tendency for the stators to gradually assume a rotation in the same direction as the rotor. This results not only from mechanical friction of the rotor on the stator hub, but also from a component of movement of the air stream tangentially discharged by the rotor.

Since the tendency of the stators to pick up rotation from the rotor varies with the speed of rotation, the slope of the vanes 71 will exactly compensate at only one rotor speed. For this reason, the vanes 71 are preferably made with tail portions 72 pivoted to the forward portion of the vanes at 73. These tail portions 72 are similar to rudders in an air stream, and they shift one way or another to control the tangential thrust of the air stream against the vanes 71 so as to compensate fully any tendency of the stators to pick up the rotation from the rotor. The tail portions 72 are operated by tillers 74 through control cables or other motion transmitting connections operated by the pilot.

Another way in which rotation of the stators can be prevented is by providing a gyroscope 75 (Fig. 16) carried by the stator assembly with the axis of rotation of the gyroscope 75 extending in a direction transverse of the direction of the rotor axis.

Fig. 15 shows a third modification of the construction in which there are a plurality of liftrings 76 spaced from the liftring surface 42 of the upper stator 28, and from each other. These liftrings 76 are connected to the upper stator 28 by vanes 78.

Fig. 15 also shows the way in which a portion of the air from the rotor 26 is supplied through the hollow interior of the arm 44 to the jet reactor 45. The fuel from the tank in the rotor flows to the reactor through a fuel pipe 79.

Fig. 16 shows the upper stator 28 equipped with a jet reactor 81 at the rearward end of the aircraft. A portion of the air from the rotor 26 is blown into a collector 83 and this air flows through a passage 84 to the combustion chamber of the reactor 81. This air is mixed with fuel from a fuel pipe 86 which delivers a jet of liquid fuel against the air current for atomization. The air fuel mixture burns in a combustion chamber 87 and is discharged rearwardly to provide a propulsion jet for driving the aircraft through the air in a horizontal direction. When the aircraft is travelling at high speed in a horizontal direction, and the air delivered by the rotor is not to be used for lift, the entire output of air from the rotor can be delivered to the jet reactor by having a retractable collector 83 that can be dropped down into position to block the flow of air to the lift rings and divert all of the air to the reactor.

With a propulsion jet reactor 81 to drive the aircraft, it is not necessary to tilt the aircraft for developing a horizontal component from the rotor discharge. However, the propulsion jet reactor 81 can be used in addition to any horizontal component developed by tilting of the aircraft.

When very high horizontal speed is desired, one or more powerful propulsion jet reactors 81 are used and the tilting of the aircraft is not relied upon for horizontal flight because the drag is somewhat increased by any tilting of the aircraft with a resulting increase in the front profile of the upper stator.

Fig. 17 shows a fourth modification of the invention in which the rotor is placed in a wing 91. This wing 91 has ailerons 93, a fin 94 and a rudder 95. The wing is an upper stator of the aircraft, and there is a lower stator 98 which functions in the same way as the other modifications of the invention. There is a propulsion jet reactor 100 at the trailing edge of the wing 91 and this jet reactor 100 is supplied with air from the rotor in the same manner as already described in connection with Fig. 16.

The wing 91 has a number of advantages over the simpler upper stator 28 when high horizontal speed is desired and when the aircraft is designed for greater carrying capacity. The wing 91 has a shape of delta wings which are designed for high speed jet planes, and the rotor 26 enclosed within the wing offers no additional drag when the aircraft is traveling at high horizontal speed.

With the modification of the invention shown in Fig. 17, the rotor 26 can be used for vertical ascent, and when the aircraft has assumed sufficient horizontal speed to derive ample lift from the wing 91, the rotor 26 can be shut off, if other means are available to supply air to the jet reactor 100. The aircraft is then operated entirely as a jet plane. A slide or door 105 can be used to cover the air inlet opening 38 during high speed horizontal flight, and provision can be made for moving the reactors 45 up into the wing in the same manner as retractable landing gear. The annular discharge space between the upper and lower stators can be closed, if desired, in a manner similar to the way in which slot controllers are used with conventional aircraft.

Fig. 19 shows a fifth modification of the invention in which a plurality of rotors 26 are enclosed within a large wing 110. This fifth modification differs from that shown in Fig. 17 principally in the size of the wing and in the use of more than one rotor 26.

In the case of multi-rotor aircraft, such as shown in Fig. 19, the gyroscope effects of the rotors compensate themselves and the normal conditions of static and aerodynamics controls takes place.

Three jet reactors 100 are provided for propelling the aircraft shown in Fig. 19. Each of these reactors is supplied with air from a different one of the rotors 26. The wings 91 and 110, shown in Figs. 17 and 19 have the advantage of providing space beyond and above the rotors for the accommodation of passengers and freight. The wing 19 has an extensive cabin 112 above the rotors, seats 114 and a center aisle 116. The cabin has windows 118, throughout its length and the pilot is located in the nose of the wing 110 with a window 120 providing good visibility to the front and sides.

The preferred embodiments, and some modifications of the invention have been illustrated and described, but other modifications can be made without departing from the invention as defined in the claims.

I claim:

1. A heavier-than-air aircraft comprising, in combination, a stator assembly comprising spaced upper and lower interconnected stator elements, a rotor mounted on said stator assembly for rotation on a vertical axis, said rotor being located between said stator elements and in a chamber formed thereby, means on said rotor for discharging air outwardly from the periphery of the rotor in a substantially horizontal direction, and an annular air foil surrounding the periphery of said rotor and having a surface lying in the path of said air and curving downwardly and forming the upper surface of an opening through the bottom of the aircraft.

2. An aircraft including an upper stator having an opening for the downward flow of air, a lower stator rigidly connected to the upper stator, a rotor housed between the stators and having radially extending blades in position to draw air downwardly through the opening in the upper stator and to discharge the air outwardly, and a lift ring surface below the upper stator and forming the upper surface of an opening through the bottom of the aircraft.

3. An aircraft comprising a rotor housed between upper and lower stators, the upper stator having an opening therethrough above the center of the rotor, and the rotor having blades that draw air through the opening and discharge it radially, and an annular lift ring surface under a portion of the upper stator beyond the peripheral limit of the rotor and forming the upper surface of an opening through the bottom of the aircraft.

4. The aircraft described in claim 3 with a jet reactor connected to the rotor by a support which extends from the rotor outwardly and downwardly to a location below the lift ring.

5. An aircraft comprising a stator assembly, a rotor housed within the stator assembly, the rotor comprising a centrifugal blower having blades that draw air downwardly through an opening in the stator assembly, and that discharge the air by centrifugal force outwardly, an annular air foil attached to the stator assembly, and in the air stream and curving downwardly and forming the upper surface of an opening through the bottom of the aircraft and power driving mechanism connected to the rotor for turning it.

6. An aircraft comprising a stator assembly, a power-driven rotor housed within the stator assembly, the rotor having a hub portion that turns on a bearing in the stator assembly about an axis extending substantially vertically, and the rotor having radially extending blades that draw air downwardly through an opening in the stator assembly around the hub portion of the rotor, and that discharge the air radially outward, power driving mechanism for turning the rotor, and a lift ring comprising an annular air foil connected to the stator assembly in the air stream discharged by the rotor, and curving downwardly and forming the upper surface of an opening through the bottom of the aircraft.

7. An aircraft including a stator assembly, a rotor comprising a centrifugal blower having a hub portion that rotates on a bearing, carried by the stator assembly, about a substantially vertical axis, radially extending blades of the rotor completely housed within the stator assembly in position to draw air downwardly through an opening in the stator assembly, said stator assembly having an annular outlet passage extending from adjacent the circumference of the rotor and downwardly and outwardly from the rotor with the upper wall of the annular passage serving as a lift ring surface against which the blast of air from the rotor is directed to impart lifting force to the aircraft the surface of the lift ring curving downwardly and forming the upper surface of an opening through the bottom of the aircraft, and power driving mechanism for the rotor.

8. The aircraft described in claim 7, characterized by a second lift ring including an annular air foil located between the upper and lower walls of the outlet through which the air from the rotor is discharged, the second lift ring being connected to the stator assembly above it by vanes that hold the second lift ring in a predetermined spaced relation to the top wall of the opening.

9. An aircraft comprising a stator assembly with a chamber therein, a rotor enclosed within the chamber, the rotor comprising a centrifugal blower with a hub portion that turns about a substantially vertical axis and on bearings carried by the stator assembly, the rotor also having radially extending blades which rotate between upper and lower walls of the chamber provided by the stator assembly, power driving mechanism for the rotor, the stator assembly having an inlet opening above the hub portion of the rotor in position to supply air to the blades, and having also an annular outlet opening extending outwardly and downwardly from a region beginning at the outer limits of the blades, and at least one annular lift ring attached to the blades and located in the air outlet of the stator assembly and in the air stream from the rotor, the surface of the lift ring curving downwardly and forming the upper surface of an opening through the bottom of the aircraft.

10. An aircraft comprising a stator assembly having a chamber therein with a central opening at the top and an annular lower opening with a lift ring surface therein, the surface of the lift ring curving downwardly and forming the upper surface of an opening through the bottom of the aircraft a rotor housed within the chamber and comprising a centrifugal blower with a hub portion that turns on a bearing on the stator assembly about a substantially vertical axis and that has radially extending blades which propel a stream of air from the central opening through the lower annular opening, fuel tanks within the hub portion of the rotor, and power driving means for the rotor including a jet reactor connected to the rotor by a frame extending from the blades outwardly and downwardly through the annular lower opening so as to locate the reactor in the ambient atmosphere below the aircraft, and a fuel line through which fuel is supplied from the tanks to the jet reactor by centrifugal force.

11. An aircraft comprising a stator assembly having a chamber therein with a central upper opening and an annular lower opening, a rotor enclosed within the chamber and comprising a centrifugal blower with radially extending blades to draw air from the upper opening and discharge it downwardly and outwardly through the annular lower opening, power driving mechanism for the rotor including a jet reactor connected to the rotor by a support extending inwardly and upwardly from the jet reactor and to the rotor, and a lift ring comprising an annular air foil in the path of the air stream discharged by the rotor, the surface of the lift ring curving downwardly and forming the upper surface of an opening through the bottom of the aircraft.

12. An aircraft as described in claim 11 characterized by a lift ring which is an annular air foil spaced from the walls of the annular opening, and further characterized by vanes extending upwardly in the path of the air stream through the lower annular opening, said vanes extending at acute angles to radii from the axis of rotation of the rotor in directions to deflect the air stream from the rotor at an angle which produces a reaction counter to the direction of rotation of the rotor for preventing the stator assembly from turning in the same direction as the rotor.

13. An aircraft comprising a stator assembly having a rotor chamber therein with a central upper opening and a downwardly and outwardly extending lower annular opening through the bottom of the aircraft, a rotor in the chamber having radially extending blades, power driving mechanism for rotating the rotor to propel an air stream downwardly through the central upper opening and outwardly through the lower annular opening, a lift ring comprising an annular air foil in the lower annular opening, vanes connected to the stator assembly and located in the path of the air stream discharged from the rotor, said vanes extending at acute angles to radii from the axis of rotation of the rotor in directions for counteracting the tendency of the stator to turn with the rotor, at least part of the vanes being adjustable angularly with respect to said radii to compensate for changes in the friction which tends to turn the stator assembly with the rotor.

14. The aircraft described in claim 13 and in which the lift ring constitutes an annular air foil located in the lower annular opening from the chamber and spaced from the upper wall of the opening, and the vanes include fixed portions that connect the lift ring to the stator assembly and movable portions that can be shifted into different angular positions transverse of said radii for producing different degrees of reaction in a direction to compensate the tendency of the stator assembly to turn with the rotor.

15. An aircraft including a rotor having radially extending blades, power driving mechanism for the rotor, a stator having a bearing on which the rotor turns about a substantially vertical axis, annular lift rings including a bottom surface of the stator in the air stream from the rotor and shaped to deflect the air stream in a direction to develop lift and forming the upper surface of an opening through the bottom of the aircraft, a plurality of other annular lift rings spaced from the bottom surface of the stator and from each other but all located in the path of the air stream from the rotor and all shaped to deflect the air stream through the opening in the bottom of the aircraft and in directions to produce lift.

16. An aircraft comprising an upper stator, a lower stator, a rotor located between the stators with radially extending blades that draw air downwardly through an opening in the upper stator and that discharge the air outwardly and downwardly through an annular outlet in the bottom of the aircraft and between the upper and lower stators, and lift rings including an annular bottom surface of the upper stator comprising a top wall of the annular outlet opening shaped to deflect air downwardly to develop lift, a second lift ring comprising an air foil spaced downwardly from the top wall of the annular outlet and attached to the rotor for rotation as a unit therewith, the inner edge of the other lift ring being located near the outer tips of the rotor blades.

17. An aircraft having an upper stator with an opening therein for the downward flow of air, a lower stator rigidly connected to the upper stator, a rotor comprising a centrifugal blower located between the stators and enclosed thereby, the rotor having a hub portion that rotates on a bearing carried by the stators and about a substantially vertically extending axis, fuel tanks within the hub of the rotor, power driving mechanism for the rotor including a jet reactor which is supplied with fuel from the fuel tanks in the rotor by centrifugal force, an air duct through which the reactor is supplied with air from the rotor, and a lift ring comprising an annular air foil with its inner edge located near the outer tips of the rotor blades, and forming the upper surface of an opening through the bottom of the aircraft to deflect the air stream from the rotor in a direction to produce lift.

18. An aircraft including a stator assembly with a chamber therein, a rotor housed within the chamber and having radially extending blades for drawing a current of air downwardly through an opening in the stator assembly and for discharging the air outwardly and downwardly through an annular outlet passage in the bottom of the stator assembly, power driving mechanism for the rotor, a lift ring in the air stream from the rotor, the surface of the lift ring curving downwardly and forming the upper surface of an opening through the bottom of the aircraft and other power means for producing a reaction in a direction substantially normal to the axis of the rotor for imparting horizontal movement to the aircraft.

19. The aircraft described in claim 18 and in which the other power means include a rearwardly directed reactor jet supplied with air by the rotor.

20. An aircraft including a stator assembly having a chamber therein, a rotor enclosed in the chamber and comprising a centrifugal blower that draws air downwardly through an opening in the top of the stator assembly and then discharges the air through a passage in the stator assembly and in an annular stream downwardly through an outlet opening in the bottom of said stator assembly, an annular lift ring in the passage and located in position to deflect the air stream and shaped to deflect the air stream in a direction to produce lift for vertical ascent, the stator assembly constituting a wing which serves as an air foil section for producing lift when the aircraft is flying horizontally at substantial speed, the wing being thick enough to include the rotor chamber, and control surfaces connected to the wing for manoeuvring the aircraft in horizontal flight.

21. An aircraft including a stator assembly having chambers therein, a rotor enclosed in each of said chambers, each rotor comprising a centrifugal blower that draws air downwardly through an opening in the top of the stator assembly and then discharges the air radially, and a lift ring around each of the blowers curving downwardly and forming the upper surface of a passage opening through the bottom of the stator assembly to deflect the air stream in a direction to produce lift.

22. The aircraft described in claim 21 and in which the stator assembly constitutes a wing which serves as an air foil section for producing lift when the aircraft is flying horizontally at substantial speed and in which the wing is thick enough to include the chambers that house the rotors, and in which the wing has control surfaces for manoeuvring in horizontal flight.

References Cited in the file of this patent

UNITED STATES PATENTS

| | | |
|---|---|---|
| 1,021,116 | Ure | Mar. 26, 1912 |
| 1,660,257 | Crespo | Feb. 21, 1928 |
| 1,724,226 | Sorensen | Aug. 13, 1929 |
| 1,908,212 | Alfaro | May 9, 1933 |
| 2,008,464 | Nishi | July 16, 1935 |
| 2,077,471 | Fink | Apr. 20, 1937 |
| 2,468,787 | Sharpe | May 3, 1949 |
| 2,485,502 | McCollum | Oct. 18, 1949 |
| 2,567,392 | Naught | Sept. 11, 1951 |
| 2,670,049 | Christie | Feb. 23, 1954 |

FOREIGN PATENTS

| | | |
|---|---|---|
| 543,399 | France | June 2, 1922 |